No. 665,697. Patented Jan. 8, 1901.
A. T. SIMPKINS.
BAKER'S OVEN.
(Application filed July 20, 1899.)

(No Model.) 2 Sheets—Sheet 1.

Witnesses.
Jesse B. Heller
Richard Eyre

Inventor.
Alvin T. Simpkins
by Harding & Harding
Attorneys.

THE NORRIS PETERS CO., PHOTO-LITHO., WASHINGTON, D. C.

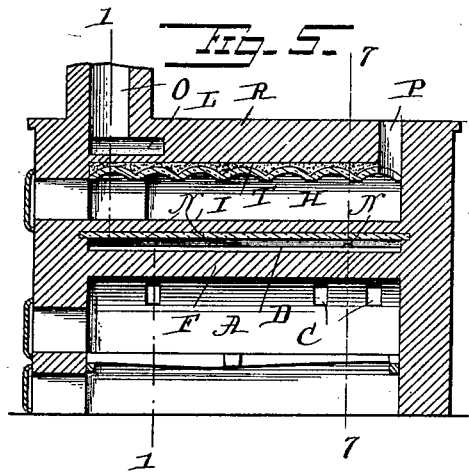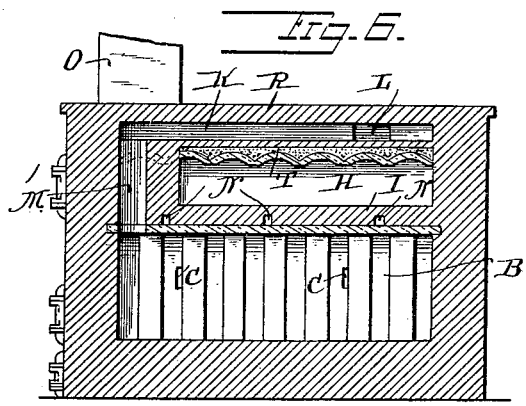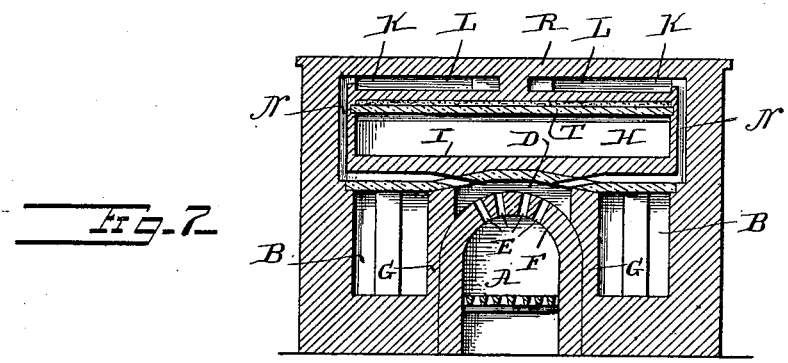

UNITED STATES PATENT OFFICE.

ALVIN T. SIMPKINS, OF ST. LOUIS, MISSOURI.

BAKER'S OVEN.

SPECIFICATION forming part of Letters Patent No. 665,697, dated January 8, 1901.

Application filed July 20, 1899. Serial No. 724,467. (No model.)

*To all whom it may concern:*

Be it known that I, ALVIN T. SIMPKINS, a citizen of the United States, residing at St. Louis, in the State of Missouri, have invented a new and useful Improvement in Bakers' Ovens, of which the following is a full, clear, and exact description, reference being had to the accompanying drawings, which form a part of this specification.

My invention relates to bakers' ovens, and has for its objects the more uniform and economical heating of the baking-chamber, the provision of means for burning the gases unburned in the main fire-chamber, the heating of the entire floor of the baking-chamber mainly by means of the heated products of combustion instead of by means directly of the fire in the main fire-chamber or through the medium of a confined air-space, which involves great waste of heat, and the prevention of warping of the floor of the baking-chamber.

To these ends my invention consists in combining with the fire-box side flues at the side of the combustion-chamber and a combined supplemental or auxiliary combustion-chamber and heating-flue arranged above the fire-box between the side flues and below the baking-chamber. It also consists in providing independent flues between the same and the top flues above the baking-chamber and in various details of construction to be hereafter described.

Figure 1:
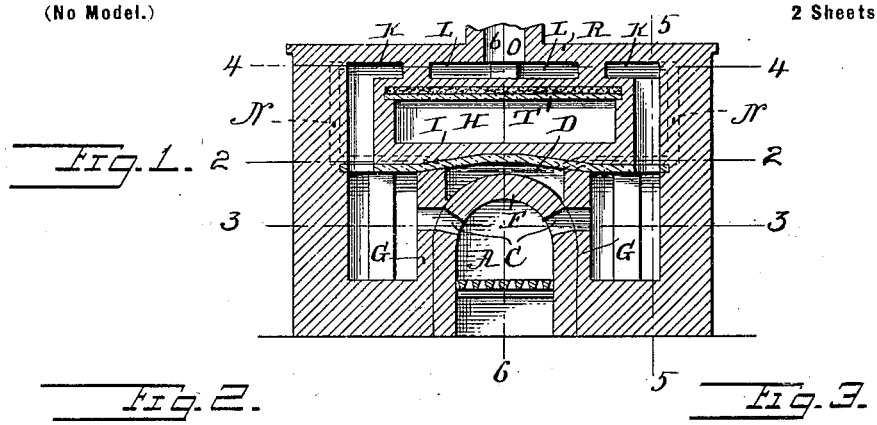
Figures 2, 3:
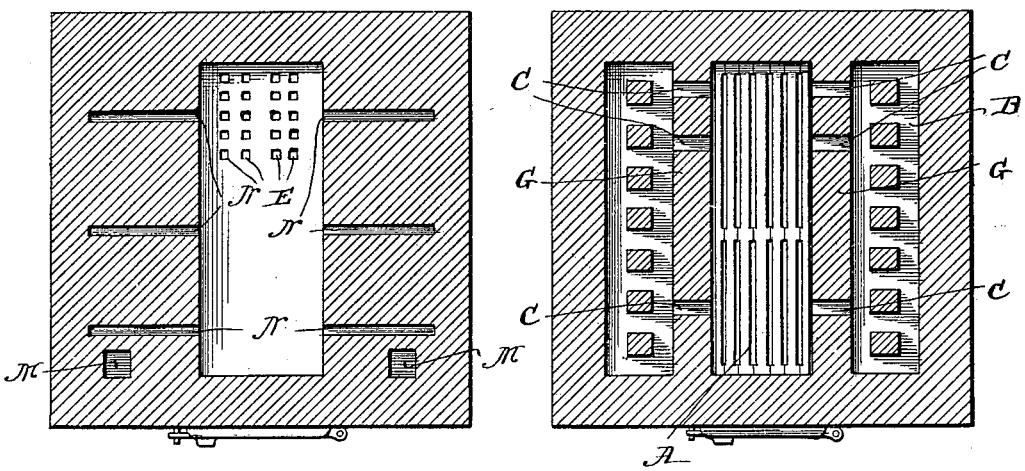
Figure 4:
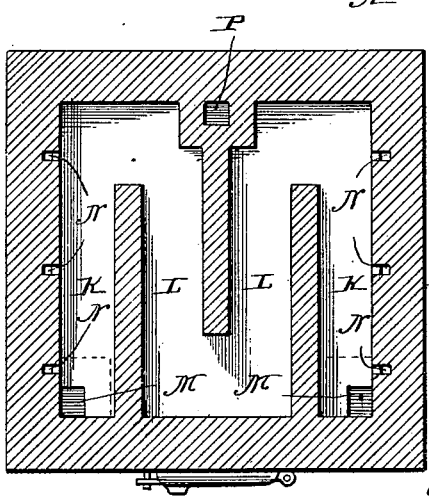

Figure 1 is a section on the line 1 1, Fig. 5, showing the main fire-chamber, auxiliary combustion-chamber, side flues, baking-chamber, top flues, and connecting-flues from the auxiliary combustion-chamber and side flues to the top flues. Fig. 2 is a section on the line 2 2, Fig. 1, showing the main combustion-chamber and side flues. Fig. 3 is a section on the line 3 3, Fig. 1, showing the auxiliary combustion-chamber and side flues. Fig. 4 is a section on the line 4 4, Fig. 1, showing the top flues above the bake-oven. Fig. 5 is a section on the line 5 5, Fig. 1. Fig. 6 is a section on the line 6 6, Fig. 1. Fig. 7 is a section on the line 7 7, Fig. 5.

A is the fire-chamber, extending centrally and longitudinally of the oven, and B B the side flues or chambers on either side of the fire-chamber and communicating therewith through the openings C, two toward the rear and one toward the front, on each side. Above the fire-chamber is the combined auxiliary combustion-chamber and supplemental flue D, communicating with the fire-chamber through the openings E in the arched roof F of the fire-chamber. These openings are preferably small, but relatively numerous, and are arranged toward the rear of the fire-chamber A and flue D and are preferably about equal in combined area to the area of one of the openings C. The fire-chamber A and each flue B are separated from each other by the base of the arch F and one of the partitions G, the opening C extending through both. The flue D is separated from the side flues B by the upper part of partitions G.

H is the baking-chamber, separated from the side flues B and flue D by the brick floor I, which is arched on its lower surface immediately over the flue D. The baking-chamber is thus heated indirectly by the fire-chamber, but directly by the heated products of combustion in the side flues B and the auxiliary combustion-chamber or central flue D.

The flue D acts as an auxiliary combustion-chamber to burn the heated gases which are unconsumed in the fire-chamber and which escape therefrom into the flue D through the openings E. The direct heat, however, produced by the burning gases in flue D is less intense than that in the fire-chamber A and is substantially equal to the heat in the side flues B, which also to some extent act as gas-burning chambers. Thus I gain the advantage of a uniform and at the same time a direct heating of the baking-oven, avoiding the employment, on the one hand, of an auxiliary air-space for indirectly heating the baking-chamber and, on the other hand, avoiding the heating of the oven directly from the fire-chamber, which acts to heat the baking-chamber to too high a degree at the center, both absolutely and relatively to the degree of heat received from the side flues.

Arranged above the roof T of the baking-chamber and beneath the roof R of the oven are the usual top flues K K L L. The upright flues M connect the front of side flues B with the front of flue K on each side. Flues N extend from each side of flue D centrally through the floor I, up through the side walls of the oven, and laterally into flues K. These flues, as shown, communicate with each end and with the central part of flue D. Any of these flues may be dispensed with; but at least one flue should be retained. Preferably the flue N at the front of the flue D is retained, so as to insure a circulation of the heat and products of combustion throughout the length of flue D.

The chimney O at the front of the oven communicates with the flues L.

P is a vent from the baking-chamber through the roof of the oven.

Part of the heated products of combustion pass from the fire-chamber through the openings C into the side flues D, through the upright flues M, the flues K, the flues L, and out the stack O. The rest of the heated products of combustion pass through openings E into the flue D, through flues N, flues K and L, and out the stack O. The gases unburned in the main fire-chamber will pass into and be consumed within the flue D, which thus also acts as an auxiliary combustion-chamber.

Having now fully described my invention, what I claim, and desire to protect by Letters Patent, is—

1. In a baker's oven, the combination with the main fire-chamber, of a central flue or chamber above the same, flues or chambers on either side of the main fire-chamber communicating with the fire-chamber, independent communication between the fire-chamber and the central flue or chamber, a baking-oven directly over the side and central flues or chambers, exhaust-flues from the side flues or chambers and exhaust-flues from the central flue or chamber extending laterally between the oven and side flue and upwardly alongside of the oven.

2. In a baker's oven, the combination with the main fire-chamber extending substantially from front to rear of the oven, of a central flue or chamber directly above and extending in the same direction as, the fire-chamber, and communicating therewith toward the rear of the fire-chamber, a flue or chamber on each side of the said chamber and communicating with the combustion-chamber, and the baking-chamber, the floor of which is directly above the central and side flues or chambers, substantially as described.

3. In a baker's oven, the combination with the main fire-chamber A, the side flues B, B, communicating therewith and substantially corresponding in length therewith and extending above the top of the fire-chamber, the central flue D directly above the fire-chamber and communicating therewith and substantially corresponding in length therewith, and between the side flues, the baking-chamber H above the side and central flues, and exhaust-flues from the flues, B, B, and D, substantially as described.

4. In a baker's oven, the combination, with the main fire-chamber A, the side flues B, B, communicating therewith, and extending above the top of the fire-chamber, the central flue D above the fire-chamber and communicating therewith, and between the side flues, the baking-chamber H above the side and central flues, and having the double roof T, R, flues within the same, flues connecting the flues B with the flues in the double roof of the baking-chamber, and flues communicating with the flue D extending laterally through the floor of the baking-chamber, up through the side wall of the oven, and communicating with the flues in the double roof.

5. In a baker's oven, the combination with the fire-chamber A having the arched top F, the partitions G on each side of the arch F, the side flues B, B, separated from the fire-chamber by partitions G, openings extending through the base of the arch and said partitions to allow the heated products of combustion to pass into said side flues, the combined auxiliary combustion-chamber and supplemental flue D separated from the main combustion-chamber by the roof of the arch F and from the side flues by partitions G, the baking-chamber H above flues B and D, openings in the roof of arch F toward the rear of the same between the main fire-chamber and the flue or chamber D, and exhaust-flues from the flues D and B, substantially as described.

6. In a baker's oven, the combination with the fire-chamber A having the arched top F, the partitions G on each side of the arch F, the side flues B, B, separated from the fire-chamber by partitions G, openings extending through the base of the arch and said partitions to allow the heated products of combustion to pass into said side flues, the combined auxiliary combustion-chamber and supplemental flue D separated from the main combustion-chamber by the roof of the arch F and from the side flues by partitions G, openings in the roof of arch F toward the rear of the same between the main fire-chamber and the flue or chamber D, the baking-chamber over the flues B and D, the flues K and L, above the baking-chamber, the flues connecting the side flues with the flues K and L, and the flues extending through the floor of the baking-chamber and the wall of the oven connecting the flue D with the flues K and L, substantially as described.

7. In a baker's oven, the combination, with the main fire-chamber A, the side flues B, B, communicating therewith, and extending above the top of the fire-chamber, the central flue D above the fire-chamber and communicating therewith, and between the side flues, the baking-chamber H above the side and central flues, and having the double roof T, R, flues within the same, flues connecting the flues B with the flues in the double roof of the baking-chamber, and flues N extending respectively from the rear, the front, and the central part of flue D for insuring circulation of the heated products of combustion throughout the entire length of flue D, and extending laterally through the floor of the baking-chamber, the side wall of the oven, and communicating with the flues in the double roof.

8. In a baker's oven, the combination with the main fire-chamber, of a flue or chamber above the same and communicating therewith and substantially corresponding in length therewith, and the flues or chambers on either side of the main fire-chamber and communicating therewith and substantially corresponding in length therewith, a baking-chamber directly above the central and side flues or chambers, exhaust-flues from the front of the side flues or chambers, and an exhaust-flue from the front of the central flue or chamber to insure circulation of the heated products of combustion throughout the entire length of said flue.

9. In a baker's oven, the combination with the main fire-chamber extending substantially from front to rear of the oven, of a central flue or chamber above the same and communicating therewith and substantially corresponding in length and width thereto, a flue or chamber on each side of the fire-chamber and central chamber and communicating with, and of substantially the same length as, the fire-chamber, the top of the side flues being higher than the top of the fire-chamber, and a baking-chamber, which is of substantially greater width than the central chamber and is located above the central chamber and the side chambers so that the floor of the same is heated by all three chambers.

In testimony of which invention I have hereunto set my hand at Philadelphia, Pennsylvania, on this 19th day of July, 1899.

ALVIN T. SIMPKINS.

Witnesses:
FRANK S. BUSSER,
RICHARD EYRE.